US012812228B2

(12) United States Patent
Sun et al.

(10) Patent No.: US 12,812,228 B2
(45) Date of Patent: Nov. 24, 2026

(54) MODULE MOTOR, CAMERA MODULE, ELECTRONIC DEVICE, AND HOUSING PREPARATION METHOD

(71) Applicant: HUAWEI TECHNOLOGIES CO., LTD., Shenzhen (CN)

(72) Inventors: Zhanli Sun, Shanghai (CN); Zhangcheng Li, Shanghai (CN); Wentao Song, Shanghai (CN); Bin Cai, Shanghai (CN); Zhiyu Cao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 21 days.

(21) Appl. No.: 18/984,797

(22) Filed: Dec. 17, 2024

(65) Prior Publication Data

US 2025/0119629 A1 Apr. 10, 2025

Related U.S. Application Data

(63) Continuation of application No. PCT/CN2023/099759, filed on Jun. 12, 2023.

(30) Foreign Application Priority Data

Jun. 17, 2022 (CN) ......................... 202210690823.6

(51) Int. Cl.

| | |
|---|---|
| ***H04N 23/54*** | (2023.01) |
| ***G03B 30/00*** | (2021.01) |
| ***H04N 23/51*** | (2023.01) |
| ***H04N 23/55*** | (2023.01) |
| ***H04N 23/57*** | (2023.01) |

(52) U.S. Cl.
CPC ............. *H04N 23/54* (2023.01); *G03B 30/00* (2021.01); *H04N 23/51* (2023.01); *H04N 23/55* (2023.01); *H04N 23/57* (2023.01)

(58) Field of Classification Search
CPC ........ H04N 23/54; H04N 23/51; H04N 23/55; H04N 23/57; G03B 30/00
See application file for complete search history.

(56) References Cited

U.S. PATENT DOCUMENTS

| | | | | |
|---|---|---|---|---|
| 8,279,289 B2 * | 10/2012 | Nagata | H04N 23/57 | 348/208.99 |
| 11,275,229 B2 * | 3/2022 | Min | G03B 5/04 | |
| 2010/0091120 A1 * | 4/2010 | Nagata | H04N 23/687 | 359/557 |
| 2017/0366717 A1 | 12/2017 | Cho et al. | | |
| 2019/0384034 A1 * | 12/2019 | Min | H02K 41/0356 | |

* cited by examiner

*Primary Examiner* — Nicholas G Giles

(57) ABSTRACT

A module motor is provided, including a base, a holder, a driver assembly, and a housing. The housing is formed with an accommodation cavity having an opening. The holder and the driver assembly are disposed in the accommodation cavity, the driver assembly is connected between the holder and the base, and the driver assembly is configured to drive the holder to move relative to the base in a direction perpendicular to the base. The housing is provided with a stop structure, the stop structure includes a connection part and a first stop part, the connection part and the first stop part are of an injection-molding integrated structure, the connection part is embedded in a through hole, and the first stop part extends into the accommodation cavity. A hardness of the stop structure is greater than or equal to a shore hardness of 20.

20 Claims, 15 Drawing Sheets

MODULE MOTOR, CAMERA MODULE, ELECTRONIC DEVICE, AND HOUSING PREPARATION METHOD

CROSS-REFERENCE TO RELATED APPLICATION

This application is a continuation of International Application No. PCT/CN2023/099759, filed on Jun. 12, 2023, which claims priority to Chinese Patent Application No. 202210690823.6, filed on Jun. 17, 2022. The disclosures of the aforementioned applications are hereby incorporated by reference in their entireties.

TECHNICAL FIELD

Embodiments of the present disclosure relate to the field of terminal technologies, and in particular, to a module motor, a camera module, an electronic device, and a housing preparation method.

BACKGROUND

In recent years, a camera function has become an important parameter for consumers to evaluate performance of a portable electronic device. Usually, a focusing function of the camera module is implemented by using a camera module motor. The camera module motor drives the optical device to move to implement the camera focusing function.

However, an optical component is prone to collide in a housing of an electronic device, and an existing solution for preventing an optical component from colliding with a housing is not conducive to miniaturization of the electronic component.

SUMMARY

Embodiments of the present disclosure provide a module motor, a camera module, an electronic device, and a housing preparation method, to achieve good protection against an impact and help achieve miniaturization of a device.

According to a first aspect, the present disclosure provides a module motor. The module motor may be used in a device component having a camera function. The module motor includes a base, a holder, a driver assembly, and a housing. The base may provide support for another structure. The housing is fixed to the base. The housing is formed with an accommodation cavity having an opening, and the base is fixed to a side of the opening on the housing. The accommodation cavity of the housing can be used to dispose the holder and the driver assembly. The driver assembly has a fixed part and a moving part. The fixed part is fixed to the base, the moving part is connected to the holder, and the moving part may move relative to the fixed part, to drive the holder to move relative to the base. Herein, a moving direction of the holder is perpendicular to the base. The housing includes a through hole and a stop structure. With the accommodation cavity of the housing as a reference, the housing has an inner surface and an outer surface, and the through hole runs through the inner surface and the outer surface. The stop structure includes a connection part and a first stop part. The connection part and the first stop part are of an injection-molding integrated structure. The connection part is embedded in the through hole, and the first stop part extends from the inner surface, in other words, the first stop part extends into the accommodation cavity. The first stop part can be used to bear an impact of the holder. A hardness of the stop structure may be greater than or equal to a shore hardness of 20. When the holder moves and hits the first stop part, the first stop part can maintain a stable structural form against great deformation, achieving a good impact-resistant effect. When the holder moves inside the accommodation cavity, the first stop part can provide protection against an impact for the moving part, to prevent the holder from directly hitting the housing. The stop structure may be formed by injection molding via the through hole, and can be implemented at any position on the housing and is not affected by a position of another component. In addition, the stop structure occupies a small space, which helps achieve miniaturization of a device.

An orthographic projection, of the first stop part, on the housing can cover the through hole. The first stop part is used to bear an impact of the holder, and a relatively large area covered by the first stop part can provide better protection against the impact.

Possibly, in a direction perpendicular to an axis of the through hole, a distance between an edge of the first stop part and an edge of the through hole is greater than or equal to a maximum radial dimension of the through hole. Because of the great hardness of the stop structure, it can be considered that the first stop part covering a relatively large area can be implemented by using a relatively small through hole, to form a relatively large area of an impact surface and meet a requirement for protection against the impact. Specifically, in the direction perpendicular to the axis of the through hole, the distance between the edge of the first stop part and the edge of the through hole is at least twice the maximum radial dimension of the through hole. For example, the maximum radial dimension of the through hole is 0.4 mm, and a distance between the edge of the first stop part and the axis of the through hole is 1 mm to 2 mm.

In a possible implementation, the stop structure further includes a second stop part. The second stop part and the connection part are of an injection-molding integrated structure, and the second stop part protrudes from the outer surface, in other words, the second stop part extends from the housing. The first stop part and the second stop part are connected by using the connection part, and the second stop part can bear a structural impact outside the housing and can improve structural stability of the stop structure. An orthographic projection, of the second stop part, on the housing can also cover the through hole.

To improve structural stability of the stop structure, the housing is further disposed with a support structure, and the support structure extends into the stop structure.

In a possible implementation, the support structure is "straight-line-shaped", two ends of the support structure are fixed to an inner wall of the through hole, and the support structure vertically crosses the axis of the through hole.

In another possible implementation, the support structure includes two support parts, the two support parts are separately fixed to the inner wall of the through hole, and the two support parts are centrosymmetric about the axis of the through hole. Possibly, each of the support parts is disposed slantwise relative to the axis of the through hole. To be specific, one end of the support part is fixed to the inner wall of the through hole, and the other end extends toward the accommodation cavity. In addition, a bent part is formed at a free end of each of the support parts, to further improve stable support of the support structure for the stop structure.

The housing may specifically include a top part and a lateral part, and the lateral part is disposed around a periphery of the top part to form the accommodation cavity; and the stop structure may be disposed on the top part, the stop structure may be disposed on the lateral part, or the stop structure may be disposed on both the top part and the lateral part.

When the stop structure is disposed on the lateral part, a height of a part, of the stop structure, extending into the accommodation cavity of the housing is 0.1 mm to 0.5 mm. When the stop structure is disposed on the top part, a height of a part, of the stop structure, extending into the accommodation cavity of the housing is 0.1 mm to 0.5 mm.

The stop structure is made of a material that includes any one of a liquid crystal polymer (LCP), a thermoplastic polyurethane rubber, a thermoplastic elastomer, silica gel, and foam. The housing is made of any one of stainless steel or the liquid crystal polymer.

When the module motor is a voice coil motor (VCM), the driver assembly includes a drive magnet and a drive coil, the drive magnet is fixed to the bottom of the holder, and the drive coil is fixed to the base. The drive coil corresponds to the drive magnet, and the drive coil and the drive magnet may implement electromagnetic induction. When the drive coil is energized, a current in the drive coil generates an electric field, and the drive magnet in the electric field moves because of the electromagnetic induction principle, to drive the holder to move.

Possibly, an elastic structure is disposed between the module motor and the holder, and the elastic structure may be a spring. A position of the stop structure corresponds to a position of the elastic structure in a height direction of the holder. In other words, the stop structure and the elastic structure may not interfere with each other.

According to a second aspect, the present invention provides a camera module, including a lens and the foregoing module motor. The lens is disposed on a holder of the module motor, and when the lens moves with the holder, the camera module can implement focusing.

According to a third aspect, the present invention provides an electronic device, for example, a smartphone or a tablet computer with a camera function. The electronic device includes a device body and the foregoing camera module. The camera module is mounted onto the device body, so that the electronic device has a good camera function.

According to a fourth aspect, the present invention provides a housing preparation method for preparing a housing of any foregoing module motor, and the housing has an accommodation cavity. The preparation method includes the following steps:

perforating the housing to form a through hole, where the through hole can run through an inner surface and an outer surface of the housing; and forming, via the through hole, a stop structure extending into the accommodation cavity of the housing.

In a possible implementation, after the through hole is formed by perforating the module motor and before the stop structure extending into the accommodation cavity of the housing is formed via the through hole, the method further includes the following steps:

forming a support structure in the through hole.

The forming, via the through hole, a stop structure extending into the accommodation cavity of the housing includes the following steps:

providing a mold, where the mold has an inner cavity;

placing the housing in the mold, so that the through hole is communicated with the inner cavity;

injecting a liquid material into the inner cavity; and cooling the liquid material to form the stop structure.

DESCRIPTION OF EMBODIMENTS

Figure 1A:
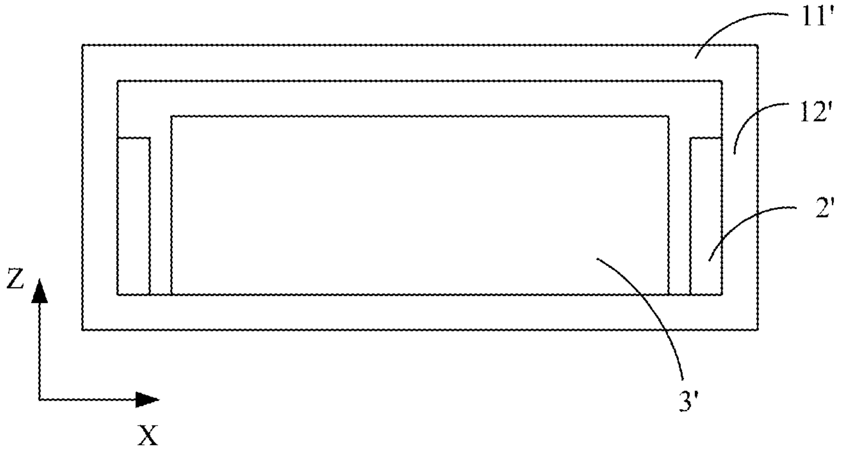
FIG. 1*a* is a schematic front view of a cross-sectional structure of a camera module motor in a conventional technology.
Figure 1B:
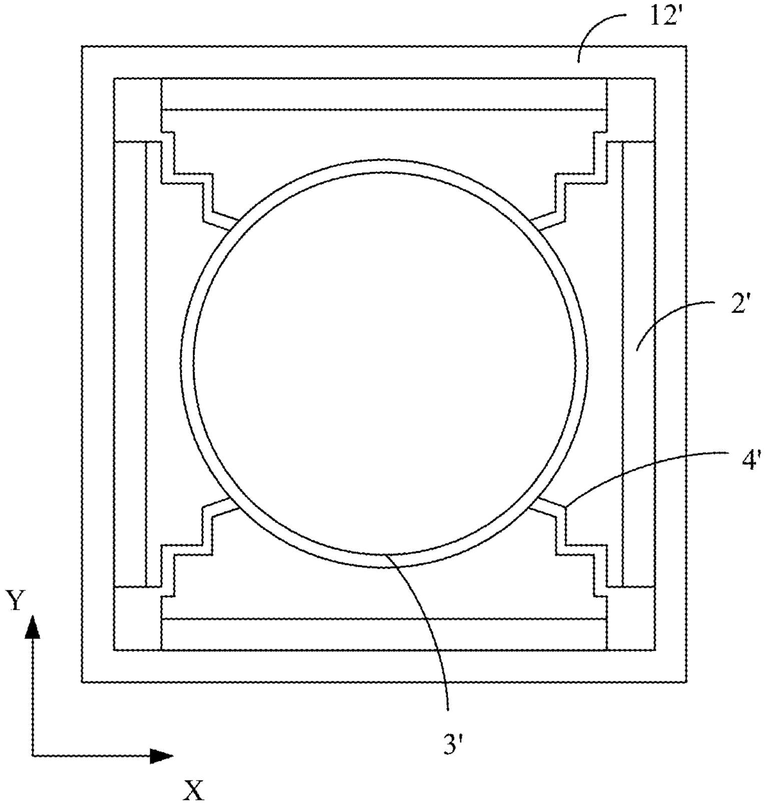
FIG. 1*b* is a schematic top view of a cross-sectional structure of a camera module motor in a conventional technology.

A camera function is an important parameter for evaluating performance of an electronic device. A camera module usually drives, by using a camera module motor, an optical device, for example, a lens to move to implement a camera focusing function. The camera module motor includes a fixed part and a moving part. As shown in FIG. la and FIG. 1*b*, the fixed part is, for example, a base 11' of the camera module motor and a lateral wall 12' fixed to the base 11', and the moving part is, for example, a holder 3' of the camera module motor. The camera module motor may drive the holder 3' to move relative to the base 11'in a pre-specified direction electromagnetically or in another manner. In this process, to avoid damage caused by a collision of the moving part with the fixed part, a stopper 2' is usually disposed on a side, of the fixed part, facing the moving part. FIG. 1*a* is front view of a cross-sectional structure of the camera module motor. The stopper 2' is fixed to the base 11' and extends along the lateral wall 12', with not only large dimensions but also a position only on the base 11' and attachment to the lateral wall 12'. FIG. 1*b* is a top view of a cross-sectional structure of the camera module motor. The stopper 2' needs to avoid another component. Herein, a spring 4' is used as an example. To avoid interference with the spring 4', the stopper 2' cannot be disposed at a corner position of the camera module, resulting in lots of limitations in design and manufacturing. It can be seen that, the impact-resistant stop structure in a conventional technology is not conducive to further miniaturization of an electronic device.

Therefore, embodiments of the present disclosure provide a module motor, a camera module, an electronic device, and a housing preparation method. When the module motor is used in a device component having a fixed part and a moving part, a relatively small stop structure can be used to bear an impact to achieve protection against the impact. In addition, the stop structure is not limited by a structure of another component, helping implement miniaturization of a device.

Terms used in the following embodiments are merely intended to describe specific embodiments, but are not intended to limit the present disclosure. As used in the description and the appended claims of the present disclosure, the terms “one”, “a”, “the”, “this” of singular forms are intended to further include expressions such as “one or more”, unless otherwise specified in the context clearly.

Reference to “an embodiment”, “some embodiments”, or the like described in this specification indicates that one or more embodiments of the present disclosure include a specific feature, structure, or characteristic described with reference to those embodiments. Therefore, statements such as “in an embodiment”, “in some embodiments”, “in some other embodiments”, and “in other embodiments” that appear at different places in this specification do not necessarily mean reference to a same embodiment. Instead, the statements mean “one or more of but not all the embodiments”, unless otherwise particularly emphasized in another manner. The terms “include”, “have”, and their variants all mean “include but are not limited to”, unless otherwise particularly emphasized in another manner.

Figure 2A:
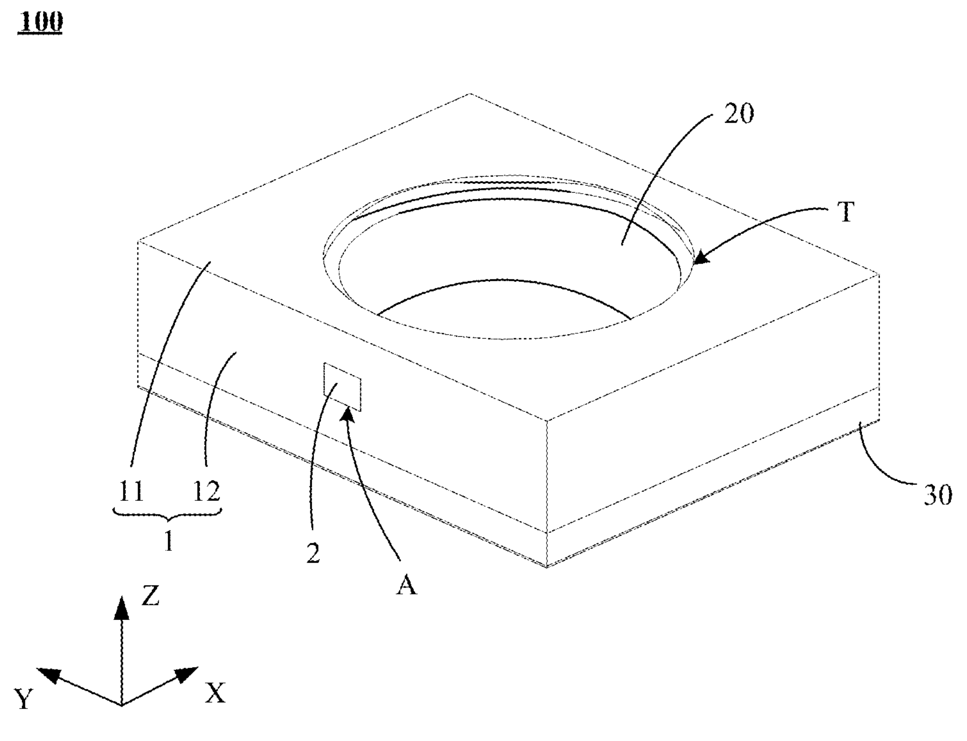
FIG. 2*a* is a diagram of a structure of a module motor according to an embodiment of the present disclosure.

As shown in FIG. 2*a*, an embodiment of the present disclosure provides a module motor 100. The module motor 100 may be configured to drive a lens on an electronic device to move for focusing. As shown in FIG. 2*a*, the module motor 100 includes a base 30, a holder 20, a driver assembly, and a housing 1. The driver assembly is not shown in the figure. The housing 1 is fixed to the base 30, and the housing 1 and the base 30 may be used as a fixed part. When the housing 1 is fixed to the base 30, the holder 20 and the driver assembly may be disposed between the base 30 and the housing 1. Specifically, the base 30 is connected to the holder 20 by using the driver assembly. When the module motor 100 is working, the driver assembly may drive the holder 20 to move in a direction perpendicular to the base 30. In other words, the driver assembly may drive the holder 20 to approach or move away from the base 30. In FIG. 2*a*, the direction perpendicular to the base 30 is a Z direction and may also be considered as a height direction of the housing 1.

When the module motor 100 is a voice coil motor, the driver assembly may specifically include a drive magnet and a drive coil. The drive magnet may be fixed to the bottom of the holder 20, the drive coil may be disposed on the base 30, and the drive coil corresponds to the drive magnet. There is electromagnetic induction between the drive magnet and the drive coil. The drive coil may be energized to generate a magnetic field, and the drive magnet in the magnetic field can be driven. When the drive coil is energized, the drive magnet in the electromagnetic field moves due to a force. In a specific structure, the drive magnet is connected to the holder 20, and when the drive coil can drive the drive magnet to move, the drive magnet can drive the holder 20 to move in a specified direction. It should be understood that, based on different usage requirements, the voice coil motor may be specifically open-loop, closed-loop, an optical image stabilizer (OIS), or another type. This is not limited herein.

The housing 1 specifically includes a top part 11 and a lateral part 12. The top part 11 is, for example, a rectangle, and the lateral part 12 is disposed around a periphery of the top part 11, so that a space that can accommodate the holder 20 and the driver assembly can be formed between the lateral part 12 and the top part 11. The base 30 is connected to the lateral part 12. The top part 11 is perpendicular to the Z direction, and a plane on which the top part 11 is located is parallel to an X direction and a Y direction. The holder 20 may be configured to hold an optical device, for example, a lens, to drive the optical device, for example, the lens, to move for focusing. To facilitate the optical device, for example, the lens, to extend from the housing 1, an open hole Tis disposed on the top part 11, of the housing 1, facing away from the base 30. Herein, for example, the open hole Tis circular.

Figure 2B:
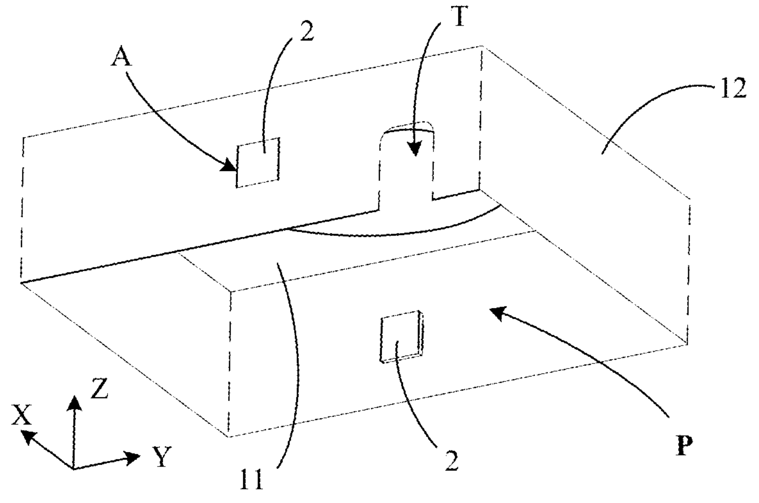
FIG. 2*b* is a diagram of a structure of a housing of a module motor according to an embodiment of the present disclosure.
Figure 2C:
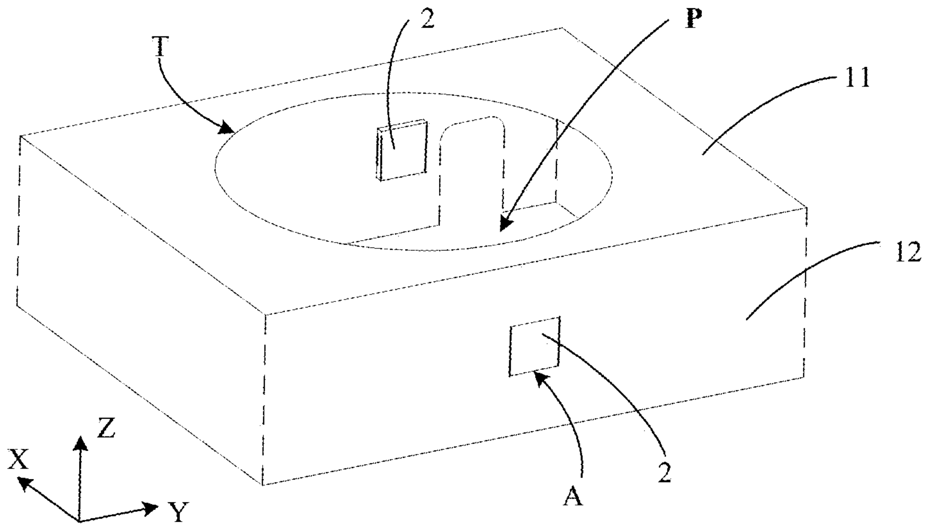
FIG. 2*c* is a diagram of a structure of a housing of a module motor according to an embodiment of the present disclosure.

With reference to FIG. 2*b* and FIG. 2*c*, an accommodation cavity P having an opening may be formed between the lateral part 12 and the top part 11, and the accommodation cavity P may be used to accommodate the holder 20 and the driver assembly. The opening of the accommodation cavity P is on a side, of the housing 1, for a connection to the base 30. The housing 1 is disposed with a stop structure 2 that runs through the housing 1, and the stop structure 2 may extend into the accommodation cavity P of the housing 1, so that the stop structure 2 can bear an impact of the holder 20 and disperse impact stress, to prevent the holder 20 in motion from colliding with an inner wall of the housing 1 and protect the holder 20 and the optical device, for example, the lens, held onto the holder 20.

Figure 3A:
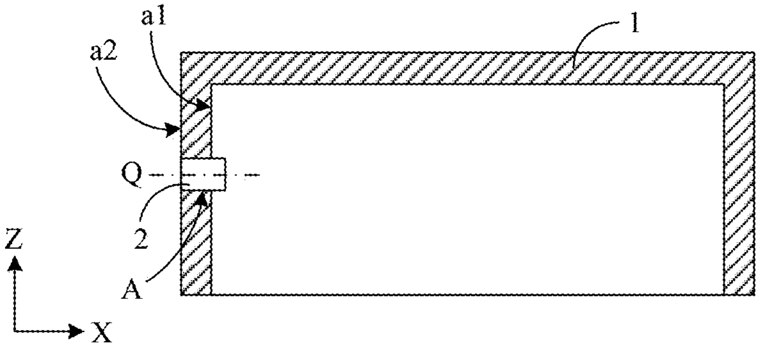
FIG. 3*a* is a diagram of a cross-sectional structure of a housing of a module motor according to an embodiment of the present disclosure.

As shown in FIG. 3*a*, the housing 1 has an inner surface a1 and an outer surface a2. Herein, division into the inner surface a1 and the outer surface a2 of the housing 1 is a relative concept. It can be generally considered that a surface, of the housing 1, facing the accommodation cavity P is referred to as the inner surface a1, and a surface, of the housing 1, facing away from the accommodation cavity P is referred to as the outer surface a2.

The housing 1 is provided with a through hole A. The through hole A may run through the inner surface a1 and the outer surface a2, and an external space on a side that is the outer surface a2 of the housing 1 and a space of the accommodation cavity P on a side that is the inner surface a1 may be communicated via the through hole A. An axis Q of the through hole A is an extension direction of the through hole A. The housing 1 is disposed with the stop structure 2. The stop structure 2 is embedded in the through hole A, and the stop structure 2 protrudes from the inner surface a1 of the housing 1. In other words, the stop structure 2 can partially extend into the accommodation cavity P. When the holder 20 accommodated in the accommodation cavity P moves relative to the base 30, the stop structure 2 can avoid a direct collision of the holder 20 with the housing 1 and protect the device component.

Figure 3B:
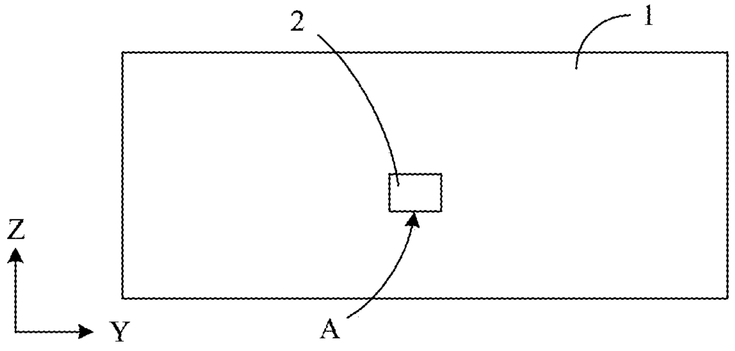
FIG. 3*b* is a diagram of a structure of a through hole on a housing of a module motor according to an embodiment of the present disclosure.
Figure 3C:
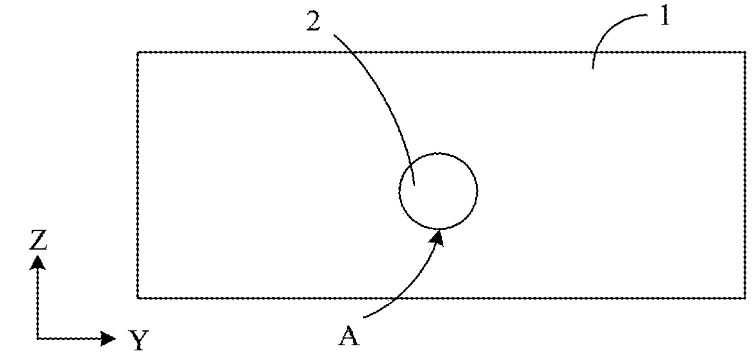
FIG. 3*c* is a diagram of a structure of a through hole on a housing of a module motor according to an embodiment of the present disclosure.

A shape of the through hole A is not limited. As shown in FIG. 3*b*, a cross section of the through hole A perpendicular to the axis Q may be a rectangle. As shown in FIG. 3*c*, a cross section of the through hole A perpendicular to the axis Q may be a circle. Usually, the shape of the through hole A is manufactured into a regular shape, to facilitate injection molding of the stop structure 2.

Figure 3D:
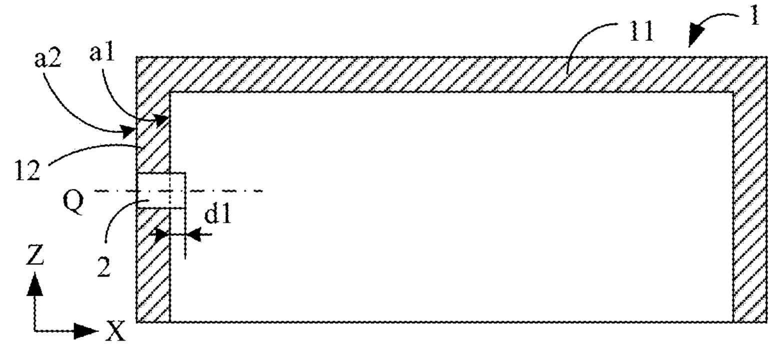
FIG. 3*d* is a diagram of a cross-sectional structure of a housing of a module motor according to an embodiment of the present disclosure.
Figure 3E:
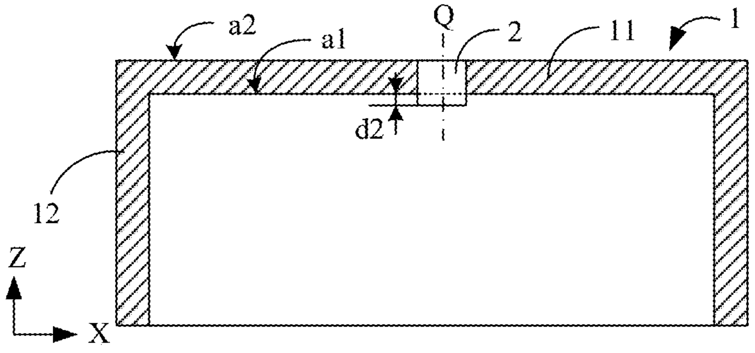
FIG. 3*e* is a diagram of a cross-sectional structure of a housing of a module motor according to an embodiment of the present disclosure.

As shown in FIG. 3*d* and FIG. 3*e*, the housing 1 has the top part 11 and the lateral part 12 disposed around the periphery of the top part 11. For example, the top part 11 is parallel to a plane on which an X direction and a Y direction are located. The lateral part 12 is perpendicular to the top part 11. In other words, the lateral part 12 is perpendicular to the X direction and the Y direction, and the lateral part 12 extends in a Z direction. The X direction and the Y direction may be considered as radial directions of the housing 1, and the Z direction may be considered as a height direction of the housing 1. With reference to the module motor 100, the holder 20 may move relative to the top part 11 in the height direction of the housing 1.

As shown in FIG. 3*d*, the stop structure 2 may be disposed on the lateral part 12. The stop structure 2 protrudes from the inner surface a1 of the lateral part 12. In the extension direction, namely, the axis Q of the through hole A, a height of a part, of the stop structure 2, protruding from the inner surface a1 of the lateral part 12 is d1, where dl herein may be 0.1 mm to 0.5 mm, for example, may be 0.25 mm. In this way, a dimension of the stop structure 2 in the radial direction of the housing 1 can be reduced, a space occupied by the stop structure 2 can be reduced, and a space occupied by the module motor 100 can be reduced. Compared with a great thickness of a stopper in a conventional technology, a benefit of a smaller dimension can be achieved in a radial direction of the module motor 100.

The stop structure 2 may alternatively be disposed on the top part 11, as shown in FIG. 3*e*. The stop structure 2 protrudes from the inner surface a1 of the top part 11. In the extension direction, namely, the axis Q of the through hole A, a height of a part, of the stop structure 2, protruding from the inner surface a1 of the top part 11 is d2, where d2 herein may be 0.1 mm to 0.5 mm, for example, may be 0.2 mm. In this way, a dimension of the stop structure 2 in the height direction of the housing 1 can be reduced, a space occupied by the stop structure 2 can be reduced, and a space occupied by the module motor 100 can be reduced. In the height direction of the module motor 100, a benefit of a smaller dimension may also be achieved.

Clearly, in a specific implementation, the stop structure 2 may be disposed only on the lateral part 12 of the housing 1, as shown in FIG. 3*d*, or may be disposed only on the top part 11 of the housing 1, as shown in FIG. 3*e*; or the stop structure 2 may be disposed on both the lateral part 12 and the top part 11. In addition, a quantity and a specific location of the stop structure 2 are not limited.

In the module motor 100 provided in embodiments of the present disclosure, the stop structure 2 is formed by injection molding. During preparation, a liquid injection molding material may be injected into a mold via the through hole A to form the stop structure 2. Because the stop structure 2 is formed by injection molding via the through hole A, a relatively small stop structure 2 can be obtained by injection molding based on a requirement and does not occupy a large volume in the accommodation cavity P of the housing 1, to facilitate miniaturization of the module motor 100. In addition, in the manner of forming the stop structure 2 by injection molding via the through hole A, the stop structure 2 may be disposed at any position as required, and decoupled from another component structure of the module motor 100, to facilitate implementation. When the module motor 100 is used in a device module, for example, a camera module, a requirement for miniaturization of the device can be met.

Figure 4:
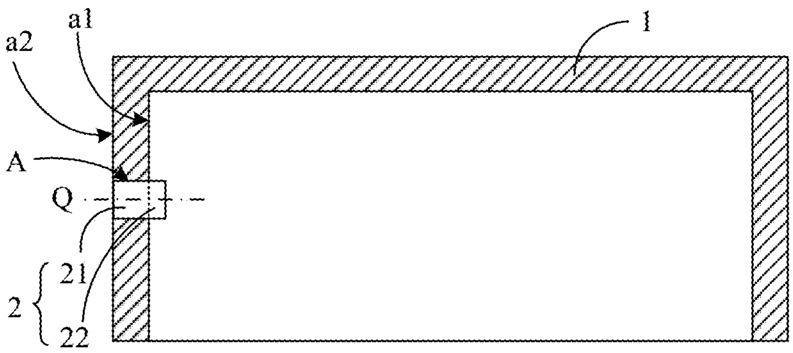
FIG. 4 is a diagram of a cross-sectional structure of a housing of a module motor according to an embodiment of the present disclosure.

As shown in FIG. 4, the stop structure 2 specifically includes a connection part 21 and a first stop part 22, and the connection part 21 and the first stop part 22 are of an injection-molding integrated structure. The connection part 21 is embedded in the through hole A, and the first stop part 22 protrudes from the inner surface a1 of the housing 1. When the inner surface a1 is used as a limit, and the accommodation cavity P of the housing 1 is used as a reference, it may be considered that the first stop part 22 is located in the accommodation cavity P. A shape of the connection part 21 is adapted to the shape of the through hole A, and the connection part 21 formed by injection molding can be closely combined with the through hole A, providing stable support for the first stop part 22 with the housing 1.

In this embodiment of the present disclosure, a purpose of disposing the stop structure 2 is to avoid a direct collision between a component structure in the housing 1 and the inner surface a1 of the housing 1. When the holder 20 moves, the holder 20 may hit the first stop part 22 of the stop structure 2. The first stop part 22 bears an impact from the holder 20 to disperse and reduce impact stress, to protect the holder 20 and another structure that may be held on the holder 20. Therefore, when the component structure hits the first stop part 22, an impact surface of the first stop part 22 for bearing an impact needs to maintain stable to some extent, and it is required that no large structural deformation occurs. Herein, a hardness of the stop structure 2 needs to be greater than or equal to a shore hardness of 20. The hardness of the stop structure 2 may be a shore hardness of 20, a shore hardness of 40, a shore hardness of 70, a shore hardness of 100, or the like. When the holder 20 on a side that is the inner surface a1 of the housing 1 hits the first stop part 22 of the stop structure 2, the first stop part 22 can resist pressure from the holder 20 and prevent a structural contact or impact between the holder 20 and the inner surface a1 of the housing 1.

Specifically, the stop structure 2 may be made of a material that includes any one of a liquid crystal polymer, a thermoplastic polyurethane rubber, and a thermoplastic elastomer. Alternatively, silica gel having a high hardness may be used. The liquid crystal polymer is a polymer in an intermediate state between a crystalline stable and liquid, and features high strength, high modulus, and excellent molding processing performance. The stop structure 2 made of the liquid crystal polymer can achieve a good impact-resistant effect between the housing 1 and the component. The housing 1 is made of a material that may specifically include any one of stainless steel and a liquid crystal polymer. A hardness of the housing 1 usually needs to be higher than the hardness of the stop structure 2, to provide good bearing and support.

Figure 5:
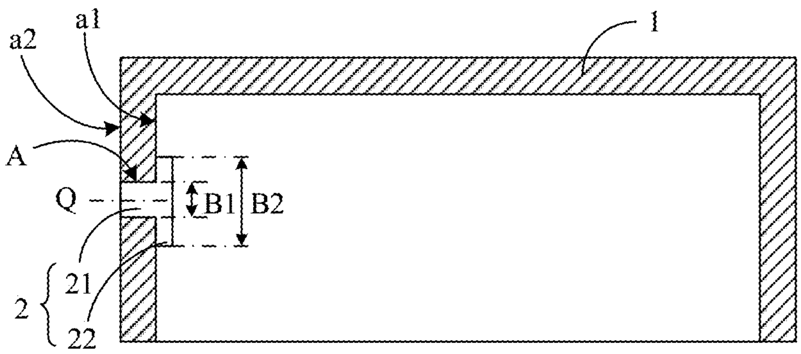
FIG. 5 is a diagram of a cross-sectional structure of a housing of a module motor according to an embodiment of the present disclosure.

The stop structure 2 is made of a material having a large hardness for stopping, so that a dimension of the first stop part 22 of the stop structure 2 may be made large enough, to achieve a good stopping effect. The dimension of the first stop part 22 herein is a dimension of the first stop part 22 in a direction perpendicular to the axis Q of the through hole A. As shown in FIG. 5, with the inner surface a1 on which the stop structure 2 is disposed as a reference, a radial dimension of the through hole A is B1. The radial dimension of the through hole A is a dimension of the through hole A in a direction perpendicular to the axis Q of the through hole A. Because a shape of the through hole A in the direction perpendicular to the axis Q may be a circle, the radial dimension B1 of the through hole A herein is a diameter of the circle. The through hole A may alternatively have another shape (for example, a rectangle) in the direction perpendicular to the axis Q, and the radial dimension B1 of the through hole A herein may be considered as a maximum radial dimension of the through hole A. A minimum radial dimension of the first stop part 22 in the direction perpendicular to the axis Q of the through hole A is B2. In the direction perpendicular to the axis Q of the through hole A, the minimum radial dimension B2 of the first stop part 22 is greater than the maximum radial dimension of the through hole A, so that the first stop part 22 can cover the through hole A. In other words, the relatively large first stop part 22 can be formed by injection molding via the relatively small through hole A, and the relatively large first stop part 22 can provide an impact surface having a relatively large area, to achieve a good impact-resistant effect. An orthographic projection, of the first stop part 22, on the inner surface a1 covers (is larger than) the through hole A, the connection part 21 is adapted to the through hole A, and the orthographic projection, of the first stop part 22, on the inner surface al further covers (is larger than) the connection part 21.

Figure 6:
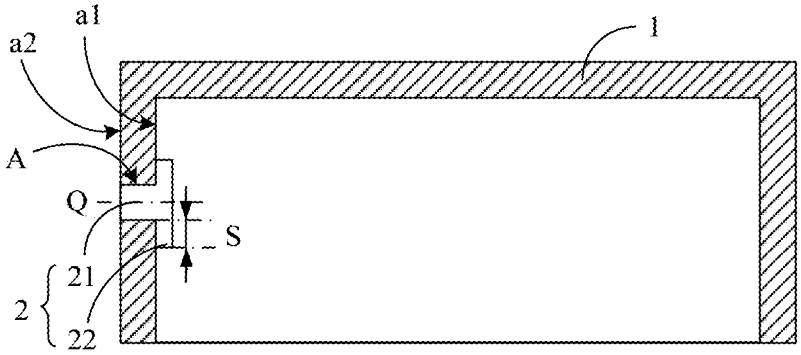
FIG. 6 is a diagram of a cross-sectional structure of a housing of a module motor according to an embodiment of the present disclosure.

As shown in FIG. 6, in the direction perpendicular to the axis Q of the through hole A, a distance between an edge of the orthographic projection, of the first stop part 22, on the inner surface al and an edge of the through hole A is S. The distance S is at least greater than or equal to a diameter of the through hole A. In some embodiments, the distance S is greater than or equal to twice the diameter of the through hole A. For example, the maximum radial dimension of the through hole A is 0.4 mm, and the distance between the edge of the orthographic projection, of the first stop part 22, on the inner surface a1 and the edge of the through hole A is 1 mm to 2 mm. It should be understood that, in the direction perpendicular to the axis Q of the through hole A, a distance between an edge of the first stop part 22 and an edge of the through hole A is a distance between an edge of the orthographic projection, of the first stop part 22, on the inner surface a1 and an edge of the connection part 21. In addition, a part of the inner surface a1 within the orthographic projection, of the first stop part 22, on the inner surface a1 is a part in contact with the first stop part 22. Therefore, in this embodiment of the present disclosure, the relatively large first stop part 22 can be formed by injection molding via the relatively small through hole A, to meet an impact-resistant requirement of a device component.

Figure 7:
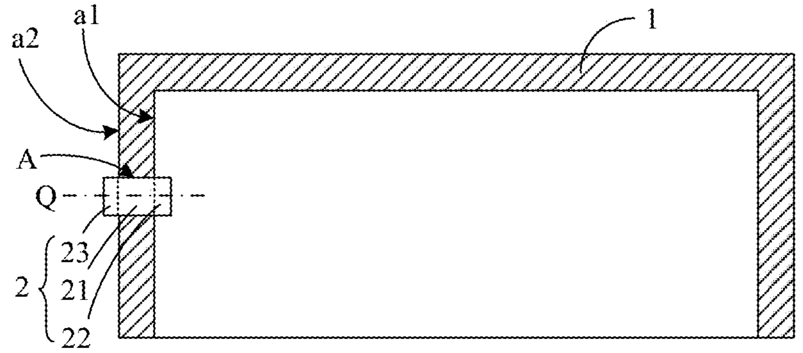
FIG. 7 is a diagram of a cross-sectional structure of a housing of a module motor according to an embodiment of the present disclosure.

In some embodiments, as shown in FIG. 7, the stop structure 2 further includes a second stop part 23, and the second stop part 23 and the connection part 21 are also of an injection-molding integrated structure. In other words, the connection part 21, the first stop part 22, and the second stop part 23 of the stop structure 2 are of an injection-molding integrated structure formed by injection molding. The second stop part 23, the connection part 21, and the first stop part 22 are sequentially arranged in an extension direction, specifically, the axis Q of the through hole A. The second stop part 23 protrudes from the outer surface a2 of the housing 1. In other words, the second stop part 23 extends from the housing 1 in a direction away from the cavity of the housing 1. When a moving part, for example, the holder 20 is disposed on the side of the inner surface a1 of the housing 1, and a moving part is further disposed on the side of the outer surface a2, the first stop part 22 may provide an impact-resistant function for the moving part, for example, the holder 20 on the side of the inner surface a1, and the second stop part 23 may provide an impact-resistant function for the moving part on the side of the outer surface a2.

Figure 8:
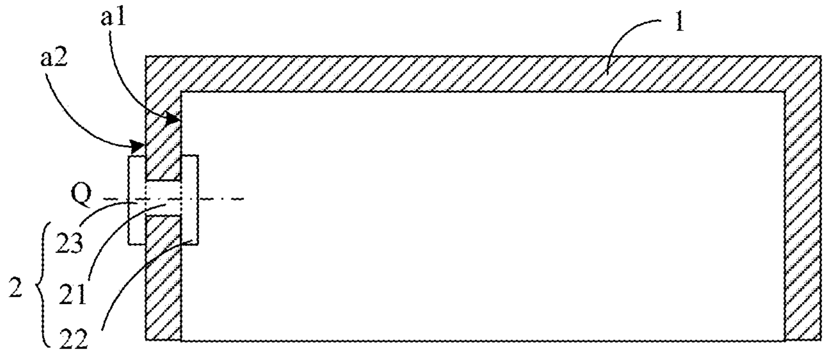
FIG. 8 is a diagram of a cross-sectional structure of a housing of a module motor according to an embodiment of the present disclosure.

Possibly, as shown in FIG. 8, a dimension of the second stop part 23 may also be made large enough. The dimension of the second stop part 23 herein is a dimension of the second stop part 23 in a direction perpendicular to the axis Q of the through hole A. With the outer surface a2 on which the stop structure 2 is disposed as a reference, an orthographic projection, of the second stop part 23, on the outer surface a2 covers (is larger than) the through hole A. The relatively large second stop part 23 can provide an impact surface having a relatively large area, to achieve a good impact-resistant effect. The connection part 21 is adapted to the through hole A, and the orthographic projection, of the second stop part 23, on the outer surface a2 further covers (is larger than) the connection part 21.

Figure 9A:
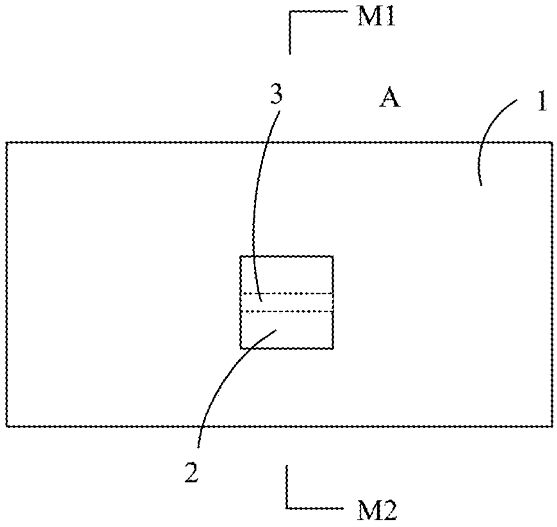
FIG. 9*a* is a diagram of a structure of a housing of a module motor according to an embodiment of the present disclosure.
Figure 9B:
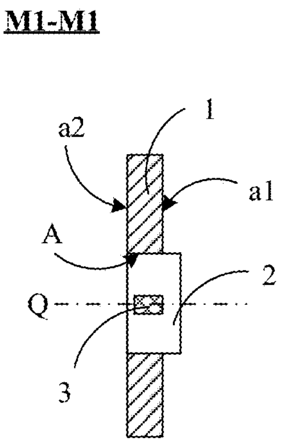
FIG. 9*b* is a diagram of a cross-sectional structure along a plane on which M1-M1 in FIG. 9*a* is located.

With reference to the foregoing embodiments, an impact surface of the stop structure 2 for bearing an impact needs to maintain stable to some extent. To improve dimensional stability of the stop structure 2, a support structure 3 may be disposed on the housing 1, and the support structure 3 can be fixed to the housing 1 and extend into the stop structure 2. As shown in FIG. 9*a*, for example, the through hole A on the housing 1 is a square hole, and the support structure 3 is disposed inside the through hole A. The support structure 3 is covered by the stop structure 2, and therefore is represented by a dashed line. The support structure 3 is "straight-line-shaped", and the support structure 3 has a relatively large length-diameter ratio. Two ends of the support structure 3 are separately fixed to an inner wall of the through hole A. The support structure 3 crosses the axis Q of the through hole A, and the through hole A may be evenly divided into two parts along a radial direction of the through hole A. In other words, the through hole A is centrosymmetric about the support structure 3. After the stop structure 2 is formed by injection molding, the support structure 3 may extend into the stop structure 2. A diagram of a cross-sectional structure shown in FIG. 9*b* may be obtained by cutting the housing 1 along a plane on which M1-M1 in FIG. 9*a* is located. In FIG. 9*b*, the support structure 3 is covered by the stop structure 2, and the support structure 3 may serve as a reinforcing structure, to improve structural stability when the stop structure 2 is hit, and meet a requirement for impact resistance. It should be understood that the support structure 3 and the housing 1 may be an integrated structure.

Figure 10A:
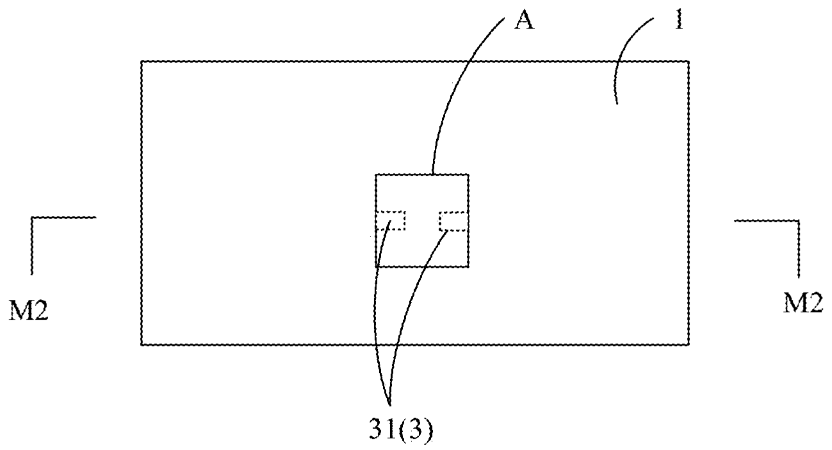
FIG. 10*a* is a diagram of a structure of a housing of a module motor according to an embodiment of the present disclosure.
Figure 10B:
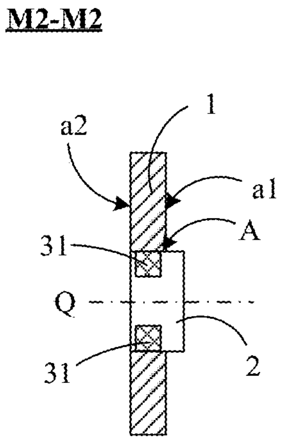
FIG. 10*b* is a diagram of a cross-sectional structure along a plane on which M2-M2 in FIG. 10*a* is located.

In an embodiment, as shown in FIG. 10*a*, the support structure 3 specifically includes two support parts 31. One end of each of the support parts 31 is fixed to the inner wall of the through hole A, and the other end of the support part 31 extends into the stop structure 2. The two support parts 31 are covered by the stop structure 2, and are represented by dashed lines. To not affect structural uniformity of the stop structure 2, the two support parts 31 are centrosymmetric about the axis Q of the through hole A. In other words, the two support parts 31 rotate 180° about the axis Q of the through hole A, and a position structure of the two support parts 31 and the through hole A does not change. A diagram of a cross-sectional structure shown in FIG. 10*b* may be obtained by cutting the housing 1 along a plane on which M2-M2 in FIG. 10*a* is located. In FIG. 10*b*, the support structure 3 is covered by the stop structure 2, and the support structure 3 may serve as a reinforcing structure, to improve structural stability when the stop structure 2 is hit, and meet a requirement for impact resistance. It should be understood that the two support parts 31 and the housing 1 may be an integrated structure.

Figure 11:
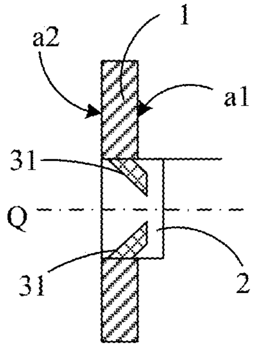
FIG. 11 is a diagram of a cross-sectional structure of a housing of a module motor according to an embodiment of the present disclosure.

To improve stable support of the support structure 3 for the stop structure 2, as shown in FIG. 11, the two support parts 31 may be disposed slantwise. One end of each of the support parts 31 is fixed to the inner wall of the through hole A, and the other end extends toward the accommodation cavity P on the side of the inner surface a1 of the housing 1. In other words, the support parts 31 are disposed slantwise relative to the axis Q of the through hole A. The two support parts 31 are "splayed", and can provide good structural support until the stop structure 2 is provided.

Figure 12A:
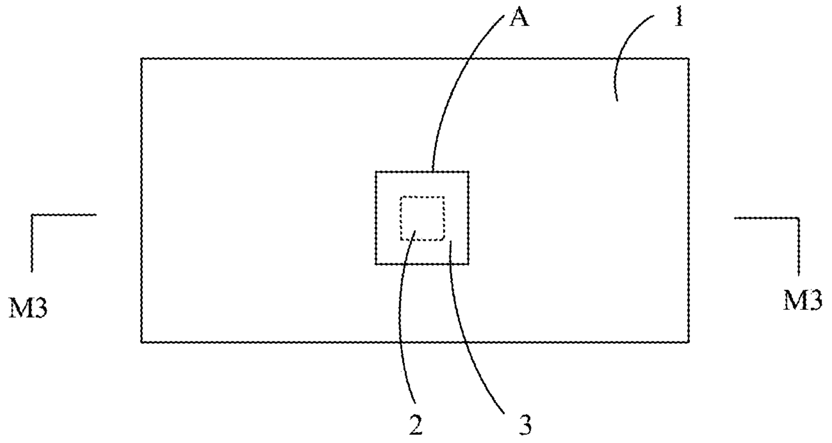
FIG. 12*a* is a diagram of a structure of a housing of a module motor according to an embodiment of the present disclosure.

When the support structure 3 and the housing 1 are an integrated structure, the through hole A may be formed by punching. As shown in FIG. 12*a*, the support structure 3 is equivalent to a peripheral residual structure generated when the through hole A is formed on the housing 1 by stamping, and the support structure 3 is disposed around the through hole A. The support structure 3 is covered by the stop structure 2, and is represented by a dashed line. A diagram of a cross-sectional structure shown in FIG. 12*b* may be obtained by cutting the housing 1 along a plane on which M3-M3 in FIG. 12*a* is located. The support structure 3 slants from the housing 1 toward the side of the inner surface a1, and forms a bent part W at a free end, of the support structure 3, facing away from the housing 1. The bent part W can further improve stability of the support structure 3 for supporting the stop structure 2, and ensure reliability of the stop structure.

Figure 13:
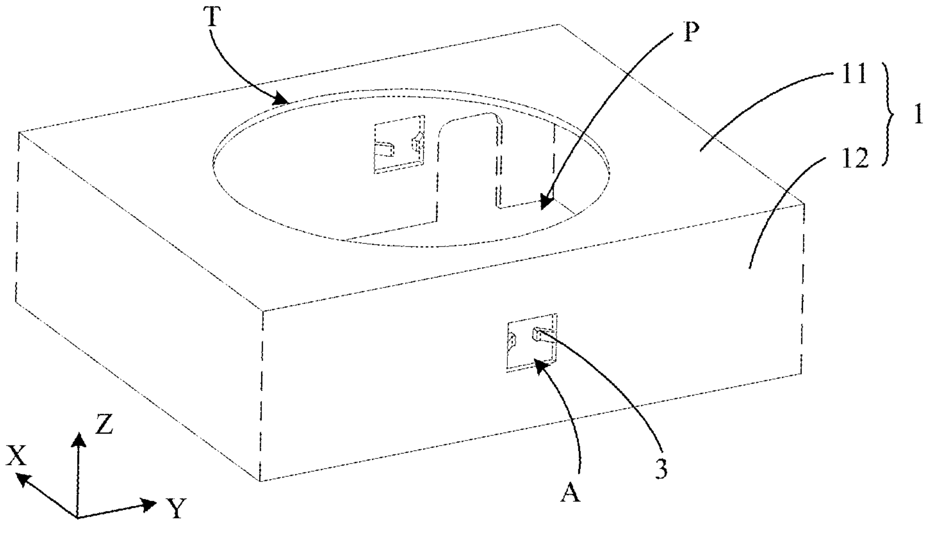
FIG. 13 is a diagram of a structure of a housing of a module motor according to an embodiment of the present disclosure.

Specifically, as shown in FIG. 13, to facilitate preparation of the stop structure 2, the support structure 3 in FIG. 12*a* may be "pruned", so that the support structure 3 has a "splayed" structure. In this case, the support structure 3 is equivalent to including two support parts 31, and the bent part W is located at a free end of the support part 31. Clearly, there may alternatively be another implementation of a structure of the support part 31. Examples are not provided herein again.

Figure 14A:
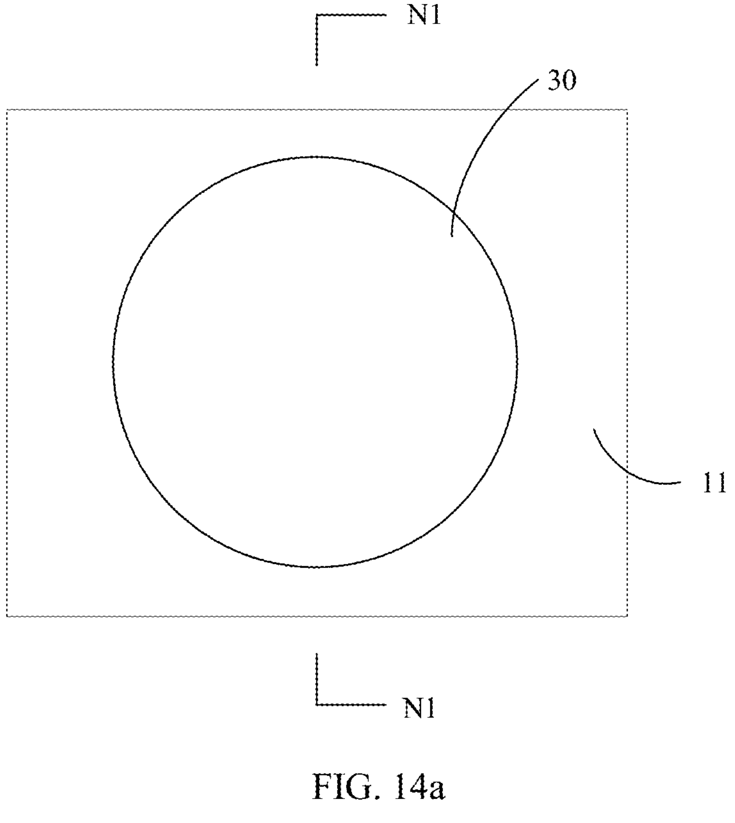
FIG. 14*a* is a top view of a module motor according to an embodiment of the present disclosure.
Figure 14B:
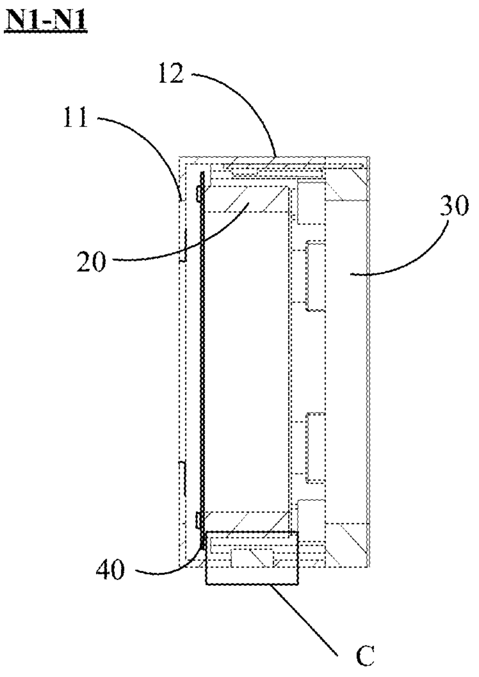
FIG. 14*b* is a diagram of a cross-sectional structure along a plane on which N1-N1 in FIG. 14*a* is located.
Figure 14C:
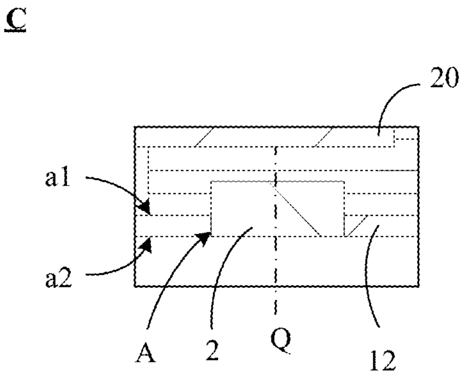
FIG. 14*c* is an enlarged view of a part C in FIG. 14*b*.

As shown in FIG. 13, two through holes A are disposed on the lateral part 12 of the housing 1, and the support structure 3 is disposed inside each through hole A. For example, the support structure 3 has a "splayed" structure, and the support structure 3 can provide more stable support for the stop structure 2, to improve stability when the stop structure 2 is hit. Possibly, the support structure 3 may alternatively include three, four, or even more support parts 31. These support parts 31 may be evenly distributed about the axis Q of the through hole A, to provide stable support for the stop structure 2 and ensure reliability of the stop structure 2. A shape of the support part 31 is not limited. With reference to a top view of the module motor 100 shown in FIG. 14*a*, the holder 20 is blocked by the top part 11 of the housing 1 and is not shown. A diagram of a cross-sectional structure of the module motor 100 shown in FIG. 14*b* is obtained by cutting the module motor 100 along a plane on which N1-N1 is located. Further, with reference to an enlarged view in FIG. 14*c* of a part C in FIG. 14*b*, the stop structure 2 runs through the through hole A on the lateral part 12 to protrude from the inner surface a1 of the lateral part 12. A part, of the stop structure 2, protruding from the inner surface al faces the holder 20. When the holder 20 moves, the stop structure 2 may bear an impact when the holder 20 is moving, to prevent the holder 20 from directly contacting or hitting the lateral part 12 of the housing 1.

Figure 15A:
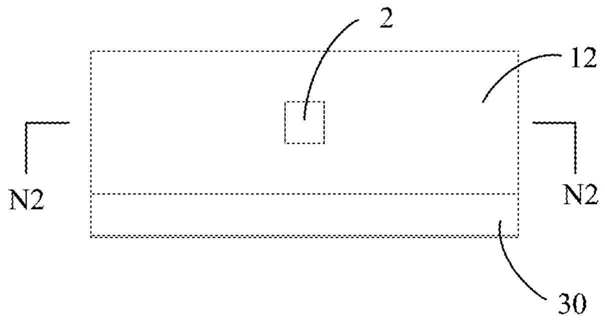
FIG. 15*a* is a front view of a module motor according to an embodiment of the present disclosure.
Figure 15B:
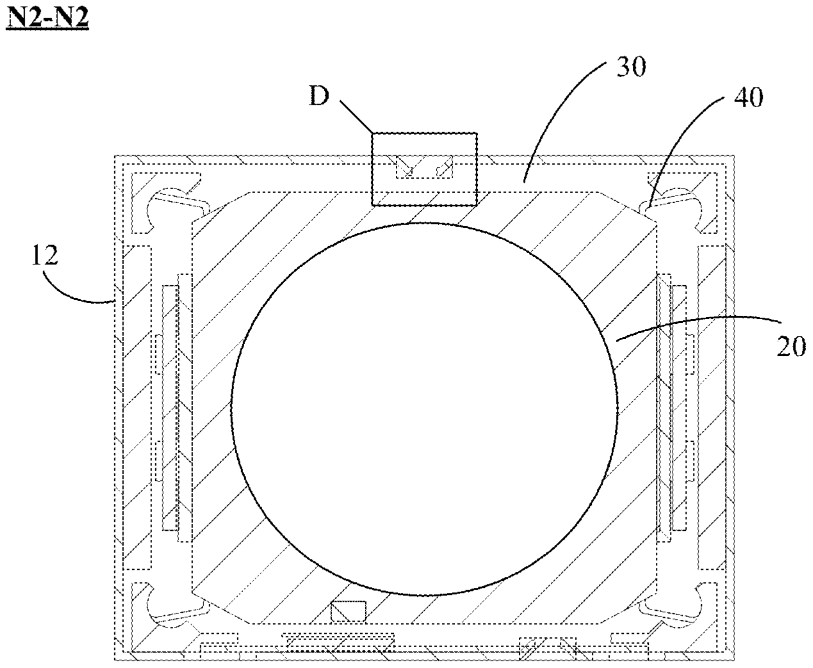
FIG. 15*b* is a diagram of a cross-sectional structure along a plane on which N2-N2 in FIG. 15*a* is located.
Figure 15C:
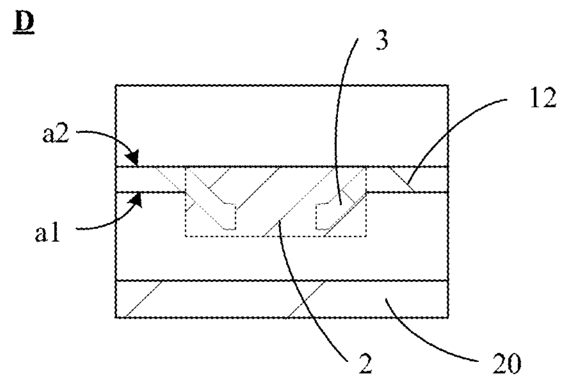
FIG. 15*c* is an enlarged view of part D in FIG. 15*b*.

With reference to a main view of the module motor 100 shown in FIG. 15*a*, a diagram of a cross-sectional structure of the module motor 100 shown in FIG. 15*b* is obtained by cutting the module motor 100 along a plane on which N2-N2 is located. In FIG. 15*b*, the holder 20 is disposed inside the cavity surrounded by the housing 1. Further, with reference to an enlarged view in FIG. 15*c* of a part D in FIG. 15*b*, the housing 1 is disposed with the support structure 3 extending into the stop structure 2. For example, the support structure 3 has a "splayed" structure, and the support structure 3 can provide more stable support for the stop structure 2, to improve stability when the stop structure 2 is hit.

In some embodiments, with reference to FIG. 14*b* and FIG. 15*b*, a spring 40 is further disposed between the holder 20 and the housing 1, and the spring 40 can provide a restoring force for the holder 20 when the holder 20 moves. The spring 40 is connected to the lateral part 12 of the housing 1, and joints are located at four corners of the lateral part 12. Because a position for disposing the stop structure 2 is not limited, and the stop structure 2 may be disposed at any position on the housing 1, the spring 40 may correspond to the stop structure 2 in the height direction of the housing 1. With the top part 11 as a reference, an orthographic projection, of the spring 40, on the top part 11 may overlap an orthographic projection, of the stop structure 2, on the top part 11. It should be understood that, both the housing 1 and the base 30 are fixed parts of the module motor 100. Therefore, the spring 40 may alternatively be disposed between the holder 20 and the fixed base 30.

Figure 16:
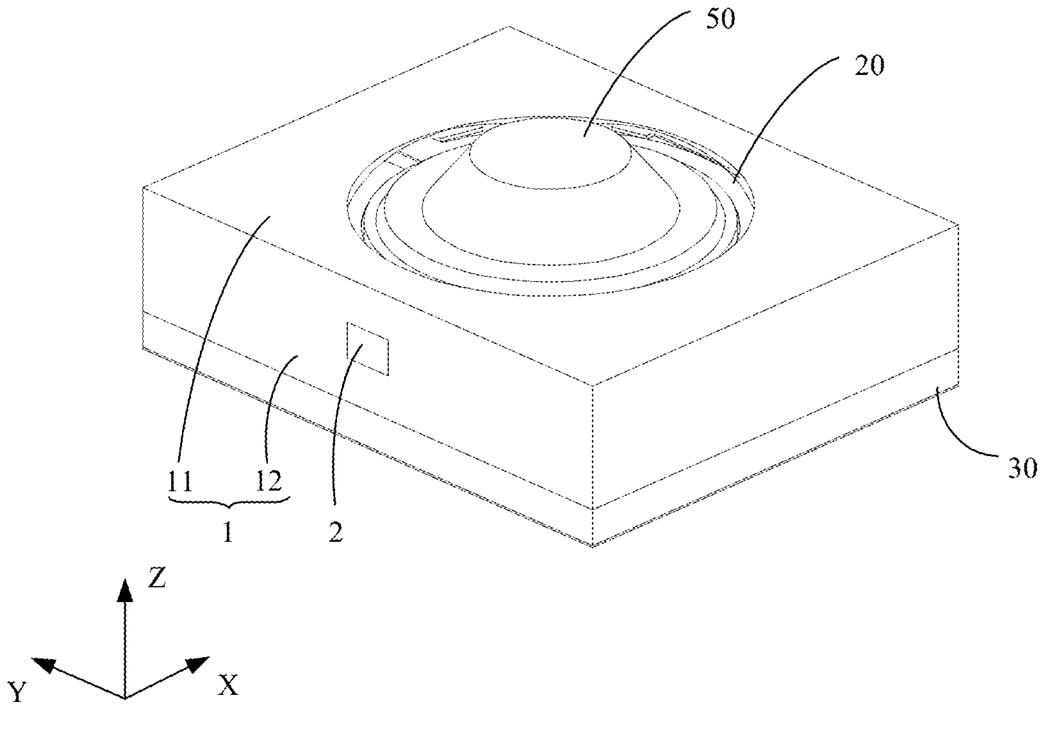
FIG. 16 is a diagram of a structure of a camera module according to an embodiment of the present disclosure.

Based on the foregoing module motor 100, an embodiment of the present disclosure further provides a camera module 200. As shown in FIG. 16, the camera module 200 includes a lens 50 and the foregoing module motor 100.

Figure 17A:
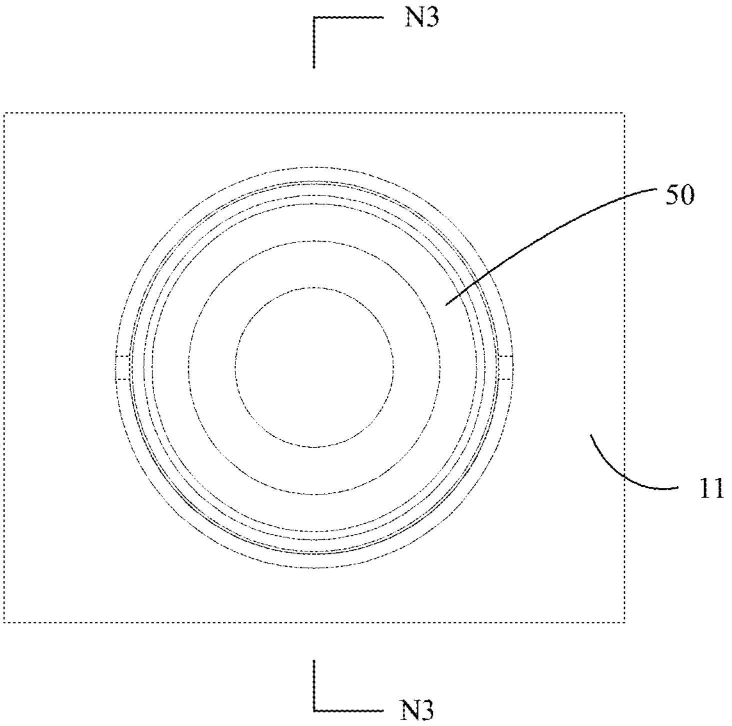
FIG. 17*a* is a top view of a camera module according to an embodiment of the present disclosure.
Figure 17B:
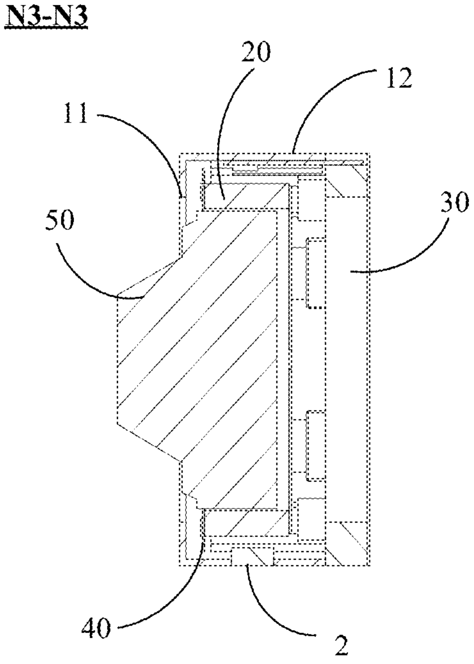
FIG. 17*b* is a diagram of a cross-sectional structure along a plane on which N3-N3 in FIG. 17*a* is located.

With reference to a top view of the camera module 200 shown in FIG. 17*a*, the lens 50 is mounted onto the holder 20 of the module motor 100. A diagram of a cross-sectional structure of the camera module 200 shown in FIG. 17*b* is obtained by cutting the camera module 200 along a plane on which N3-N3 is located. When the holder 20 moves relative to the base 30 and the module motor 100 in the height direction of the module motor 100, the lens 50 may move with the holder 20 for focal length adjustment.

Figure 18:
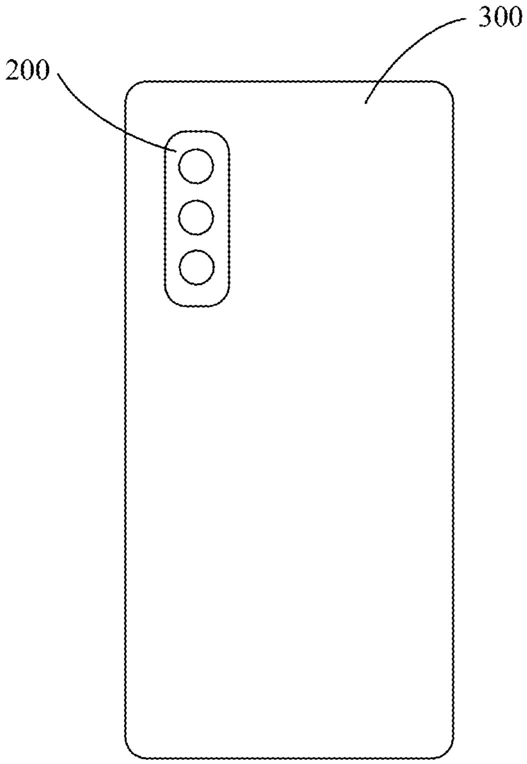
FIG. 18 is a diagram of a structure of an electronic device according to an embodiment of the present disclosure.

Based on the foregoing camera module 200, an embodiment of the present disclosure further provides an electronic device. As shown in FIG. 18, the electronic device may be specifically a device having a camera function, for example, a smartphone or a tablet. The camera module 200 is mounted onto a body 300 of the electronic device, and an image is obtained by using the camera module 200. In a process of obtaining the image, a focal length of the lens 50 can be adjusted by using the module motor 100, to meet a photographing requirement. For structures of the camera module 200 and the module motor 100, refer to the foregoing embodiments. Examples are not provided herein again.

Figure 19A:
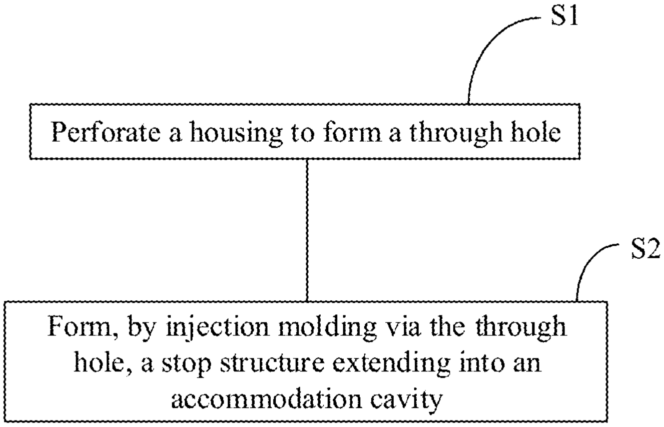
FIG. 19*a* is a schematic flowchart of a housing preparation method according to an embodiment of the present disclosure.

Based on the structure of the housing 1 of the module motor 100, an embodiment of the present disclosure further provides a method for preparing the housing 1. The preparation method is used to prepare the housing 1 of the module motor 100. The housing 1 has the accommodation cavity P. As shown in FIG. 19*a*, the preparation method includes the following steps.

S1: Perforate the housing to form a through hole.

With reference to the structure of the housing 1 shown in FIG. 2*b*, FIG. 2*c*, and FIG. 3*a*, any position on the housing 1 may be perforated as required to form the through hole. When the housing 1 has the structure shown in FIG. 3*d* and FIG. 3*e*, in other words, the housing 1 has the top part 11 and the lateral part 12 disposed around the periphery of the top part 11, the top part 11 or the lateral part 12 may be perforated.

S2: Form, by injection molding via the through hole, a stop structure extending into the accommodation cavity.

The stop structure 2 may be prepared by in-mold injection molding. When the stop structure 2 has the connection part 21 and the first stop part 22 shown in FIG. 4 or FIG. 5, the through hole A may be used as a gate in an injection molding process. To be specific, a liquid material used for injection molding may enter the side of the inner surface a1 of the housing 1 via the through hole A to form the first stop part. When the stop structure 2 has the connection part 21, the first stop part 22, and the second stop part 23 shown in FIG. 7 or FIG. 8, the second stop part 23 may be directly formed by injection molding on the side of the outer surface a2, and the first stop part 22 may be formed by injection molding by transferring the liquid material to the side of the inner surface a1 via the through hole A.

Figure 19B:
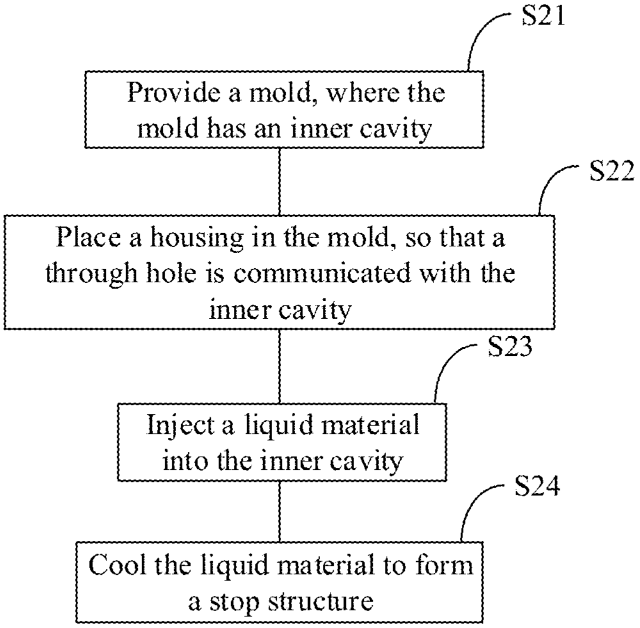
FIG. 19*b* is a schematic flowchart of a housing preparation method according to an embodiment of the present disclosure.

Specifically, as shown in FIG. 19*b*, step S2 may include the following steps.

S21: Provide a mold, where the mold has an inner cavity, and the inner cavity of the mold is adapted to a shape of the stop structure 2.

S22: Place the housing in the mold, so that the through hole is communicated with the inner cavity, where the through hole A on the housing 1 may be used as a gate or a flowing channel for an injection molding process.

S23: Inject the liquid material into the inner cavity, where the liquid material may be specifically any one of a liquid crystal polymer that is in a liquid state, a thermoplastic polyurethane rubber, or a thermoplastic elastomer; or may be liquid silica gel.

S24: Cool the liquid material to form the stop structure.

Figure 19C:
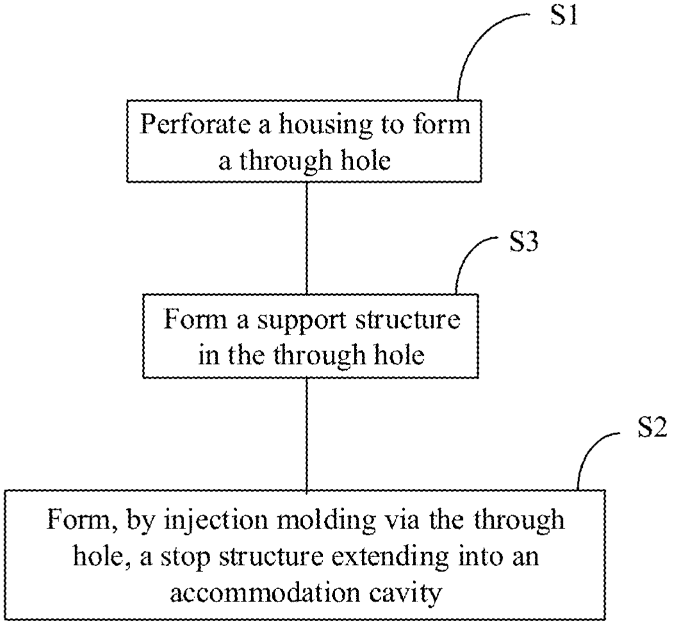
FIG. 19*c* is a schematic flowchart of a housing preparation method according to an embodiment of the present disclosure.

When the module motor 100 is further provided with the support structure 3 shown in FIG. 9*a*, FIG. 10*a*, FIG. 11, and FIG. 12*a*, after step S1 and before step S2, as shown in FIG. 19*c*, the preparation method may further include the following steps.

S3: Form a support structure in the through hole.

Figure 12B:
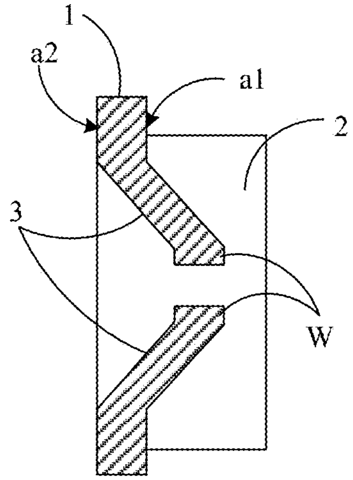
FIG. 12*b* is a diagram of a cross-sectional structure along a plane on which M3-M3 in FIG. 12*a* is located.

In FIG. 9*a*, the support structure 3 is "straight-line-shaped", the two ends of the support structure 3 are fixed to the inner wall of the through hole A, and the support structure 3 vertically crosses the axis Q of the through hole A. In FIG. 10*a*, the support structure 3 includes two support parts 31, and the two support parts 31 are centrosymmetric about the axis Q of the through hole A. One end of each of the support parts 31 is fixed to the inner wall of the through hole A, and the other end extends into the through hole A. In FIG. 11, the two support parts 31 are disposed slantwise relative to the inner wall of the through hole A. In FIG. 12*a*, the support structure 3 is formed on the inner wall of the through hole A, and is ring-shaped. With reference to FIG. 12*b* and FIG. 13, the free end of the support structure 3 may be further formed with the bent part W.

It should be understood that the support structure 3 can improve structural reliability of the stop structure 2, and when the stop structure 2 is hit by the moving holder 20, stability of the impact surface is maintained, to effectively reduce impact stress.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A module motor, comprising:
- a base;
- a holder;
- a driver assembly;
- a housing formed with an accommodation cavity having an opening, and wherein the base is disposed on a side of the opening of the housing; and
- the holder and the driver assembly are disposed in the accommodation cavity, the driver assembly is connected between the holder and the base, the driver assembly is configured to drive the holder to move relative to the base in a direction perpendicular to the base, the housing is provided with a through hole and a stop structure, the stop structure comprises a connection part and a first stop part, the connection part and the first stop part are of an injection-molding integrated structure, the connection part is embedded in the through hole, the first stop part extends into the accommodation cavity to bear an impact of the holder, and a hardness of the stop structure is greater than or equal to a shore hardness of 20.

2. The module motor according to claim 1, wherein an orthographic projection, of the first stop part, on the housing is larger than the through hole.

3. The module motor according to claim 2, wherein in a direction perpendicular to an axis of the through hole, a distance between an edge of the first stop part and an edge of the through hole is greater than or equal to a maximum radial dimension of the through hole.

4. The module motor according to claim 3, wherein in the direction perpendicular to the axis of the through hole, the distance between the edge of the first stop part and the edge of the through hole is at least twice the maximum radial dimension of the through hole.

5. The module motor according to claim 1, wherein the stop structure further comprises a second stop part, the second stop part and the connection part are of an injection-molding integrated structure, the second stop part extends from the housing, and the second stop part is configured to bear an external impact.

6. The module motor according to claim 5, wherein an orthographic projection, of the second stop part, on the housing is larger than the through hole.

7. The module motor according to claim 1, wherein the housing is further disposed with a support structure, and the support structure extends into the stop structure.

8. The module motor according to claim 7, wherein two ends of the support structure are fixed to an inner wall of the through hole, and the support structure vertically crosses the axis of the through hole.

9. The module motor according to claim 8, wherein the support structure comprises two support parts, the two support parts are separately fixed to the inner wall of the through hole, and the two support parts are centrosymmetric about the axis of the through hole.

10. The module motor according to claim 9, wherein one end of each of the support parts is fixed to the inner wall, and the other end extends toward the accommodation cavity.

11. The module motor according to claim 9, wherein a bent part is formed at a free end of each of the support parts.

12. The module motor according to claim 1, wherein the housing comprises a top part and a lateral part, and the lateral part is disposed around a periphery of the top part to form the accommodation cavity; and the stop structure is located on at least one of the top part and the lateral part.

13. The module motor according to claim 1, wherein the stop structure is made of a material that comprises any one of a liquid crystal polymer, a thermoplastic polyurethane rubber, and a thermoplastic elastomer.

14. The module motor according to claim 1, wherein the housing is made of a material that comprises stainless steel and a liquid crystal polymer.

15. The module motor according to claim 1, wherein the driver assembly comprises a drive magnet and a drive coil, the drive magnet is fixed to the bottom of the holder, the drive coil is fixed to the base, and the drive coil corresponds to the drive magnet.

16. The module motor according to claim 1, wherein an elastic structure is disposed in a height direction of the holder in a manner that prevents the elastic structure and the stop structure from interfering with each other; and a position of the stop structure corresponds to a position of the elastic structure in a moving direction of the holder.

17. An electronic device, comprising:

a device body;

a camera module mounted onto the device body, the camera module comprising:

a lens; and a module motor; comprising a base, a holder, a driver assembly, and a housing, wherein:

the housing is formed with an accommodation cavity having an opening, and the base is fixed to a side of the opening on the housing; and the holder and the driver assembly are disposed in the accommodation cavity, the driver assembly is connected between the holder and the base, the driver assembly is configured to drive the holder to move relative to the base in a direction perpendicular to the base, the housing is provided with a through hole and a stop structure, the stop structure comprises a connection part and a first stop part, the connection part and the first stop part are of an injection-molding integrated structure, the connection part is embedded in the through hole, the first stop part extends into the accommodation cavity to bear an impact of the holder, and a hardness of the stop structure is greater than or equal to a shore hardness of 20; and the lens is fixed to the holder.

18. A housing preparation method for preparing a housing of a module motor, wherein the module motor comprises a base, a holder, a driver assembly, and a housing;

the housing is formed with an accommodation cavity having an opening, and the base is disposed on a side of the opening on the housing; and the holder and the driver assembly are disposed in the accommodation cavity, the driver assembly is connected between the holder and the base, the driver assembly is configured to drive the holder to move relative to the base in a direction perpendicular to the base, the housing is provided with a through hole and a stop structure, the stop structure comprises a connection part and a first stop part, the connection part and the first stop part are of an injection-molding integrated structure, the connection part is embedded in the through hole, the first stop part extends into the accommodation cavity to bear an impact of the holder, and a hardness of the stop structure is greater than or equal to a shore hardness of 20;

wherein the method comprises:

perforating the housing to form the through hole, wherein the through hole runs through the housing; and forming, via the through hole, a stop structure extending into the accommodation cavity of the housing.

19. The preparation method according to claim 18, wherein after the perforating the housing to form the through hole and before the forming, via the through hole, the stop structure extending into the accommodation cavity of the housing, the method further comprises:

forming a support structure in the through hole.

20. The preparation method according to claim 18, wherein the forming, via the through hole, the stop structure extending into the accommodation cavity of the housing comprises:

providing a mold, wherein the mold has an inner cavity;

placing the housing in the mold, so that the through hole is communicated with the inner cavity;

injecting a liquid material into the inner cavity; and cooling the liquid material to form the stop structure.

* * * * *